United States Patent [19]

Krejza et al.

[11] Patent Number: 5,226,552

[45] Date of Patent: Jul. 13, 1993

[54] SET OF COOKING UTENSILS

[75] Inventors: Juergen Krejza, Kuchen; Hermann Schwarz, Geislingen/Steige, both of Fed. Rep. of Germany

[73] Assignee: WMF Wuerttembergische Metallwarenfarik AG, Geislingen/Steige, Fed. Rep. of Germany

[21] Appl. No.: 838,517

[22] Filed: Feb. 19, 1992

[30] Foreign Application Priority Data

Feb. 19, 1991 [DE] Fed. Rep. of Germany ... 9101938[U]

[51] Int. Cl.$^5$ .............................. B65D 21/00
[52] U.S. Cl. .................. 220/23.83; 220/23.86; 220/912
[58] Field of Search ............... 206/503, 505; 220/912, 220/574, 23.83, 23.86

[56] References Cited

U.S. PATENT DOCUMENTS

| 2,177,487 | 10/1939 | Howlett | 220/912 X |
| 2,199,687 | 5/1940 | Blankenship | 220/23.86 X |
| 2,223,432 | 12/1940 | Smith | 220/912 X |
| 2,412,325 | 12/1946 | Devine et al. | 220/23.83 X |
| 2,980,280 | 4/1961 | Herlow | 220/23.83 X |
| 4,091,953 | 5/1978 | Daenen | 220/23.86 |
| 4,574,776 | 3/1986 | Hidle | 220/23.83 X |

FOREIGN PATENT DOCUMENTS

| 1814978 | 9/1970 | Fed. Rep. of Germany . |
| 986944 | 6/1951 | France . |
| 1477770 | 4/1967 | France . |
| 2026206 | 9/1970 | France . |

Primary Examiner—Steven M. Pollard
Attorney, Agent, or Firm—Darby & Darby

[57] ABSTRACT

There is described a set of cooking utensils consisting of at least first and second cooking utensils having different heights and identical opening widths, each cooking utensil having a bottom, a wall and an upper edge. For storing purposes, the second, higher cooking utensil is adapted to be inserted into the first, lower cooking utensil in such a way that the bottom of the second cooking utensil rests on the bottom of the first cooking utensil. To be able to fabricate such a set of cooking utensils in a simple way, it is suggested that the second cooking utensil comprise a reduced first wall portion which adjoins bottom, a transition portion and a second wall portion, the outer width of the first wall portion of the second cooking utensil being smaller than the inner width of the first cooking utensil, and the height of the first wall portion of the second cooking utensil being matched to the height of the first cooking utensil in such a way that the bottom of the second cooking utensil is adapted to be put on the bottom of the first cooking utensil.

19 Claims, 2 Drawing Sheets

SET OF COOKING UTENSILS

DESCRIPTION

This invention relates to a set of cooking utensils of the type outlined in the preamble of claim 1.

DE-OS 18 14 978 discloses such a set of cooking utensils of corresponding opening widths. Cooking utensils with the same opening widths must also have about the same bottom diameter in conformity with standards. The course of the wall between opening width and bottom is thus more or less fixed. To be able to stack such cooking utensils into each other for a space-saving storage without the same getting jammed, this invention suggests three alternative constructional developments. In one embodiment, the cooking utensils of the set are formed with different angles of inclination of the cooking utensil wall. Although in the other embodiments the walls of the cooking utensils of the set have the same angle of inclination, they have either bottoms of different thickness or different transition radii between bottom and wall. Hence, all of the three embodiments require a different design for each cooking utensil to permit stacking without any jamming.

It is the object of the invention to provide a set of cooking utensils which, in spite of their simple fabrication, can be safely stacked without getting jammed.

This object is attained with the features specified in claim 1.

The reduced wall portion which, in accordance with the invention, is at least provided on the cooking utensil that is to be inserted into another cooking utensil of the set permits a jam-free stacking of the cooking utensils that have the same opening diameter. It is ensured by the expedient adaptation of the height of the reduced first wall portion that, as far as the set of cooking utensils according to the invention is concerned, the bottoms of the superimposed cooking utensils are also in contact with each other. This guarantees the lowest possible stacking height on the one hand and a tilt-free stacking on the other hand. The cooking utensils of one set substantially differ from each other only by their total height and the height of the first wall portion and, optionally, by the diameter of the first wall portion if more than two cooking utensils are to be stacked into each other. From a manufacturing point of view, however, these modifications are by far less difficult to make than changes in the inclination of the wall or in the bottom thickness, with the latter additionally influencing the cooking properties of the cooking utensils.

The cooking utensils of the set can be deep-drawn in a simple way thanks to the design outlined in claim 2, with claim 3 relating to an especially preferred cross-sectional shape.

In accordance with claim 4, it is possible to use bottoms of the same dimension for all cooking utensils of one set owing to the inventive design of the cooking utensils.

In accordance with claims 5-7, the inventive design may also be employed for sets of cooking utensils including more than two cooking utensils.

Claims 8 and 9 regard other constructional developments.

An embodiment of the invention shall now be explained in more detail with reference to the drawings, in which.

Figure 1:
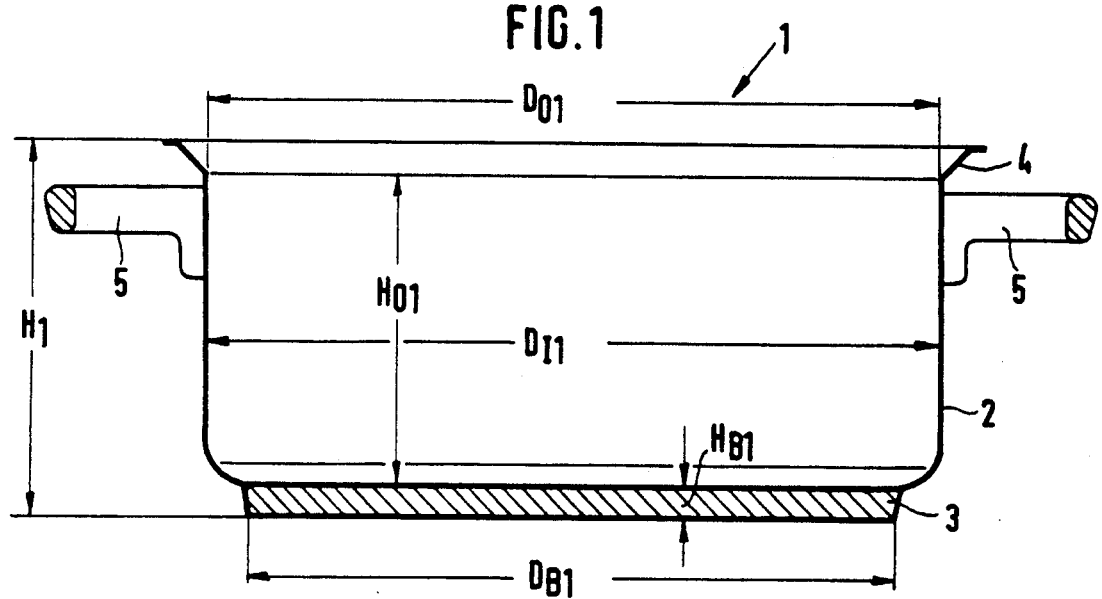
FIG. 1 is a diagrammatic view of a first cooking utensil of a set of cooking utensils.

FIG. 1 shows a first cooking utensil of a set in the form of a cooking pot 1 which comprises a cylindrical wall 2 of circular cross-section, a bottom 3 formed as a heat distributing plate, and an upper edge 4 bent outwardly at an angle of 45°. Two commercially available handles 5 are fastened to wall 2 on the outside. In the area of the upper edge, cooking pot 1 has an opening width of a diameter $D_{O1}$ which corresponds to the inner width, expressed by the inner diameter $D_{I1}$. Bottom 3 has a thickness $H_{B1}$ and a diameter $D_{B1}$ adapted to the opening diameter $D_{O1}$ in accordance with standards. Cooking pot 1 is relatively low and has a height $H_1$.

Figure 2:
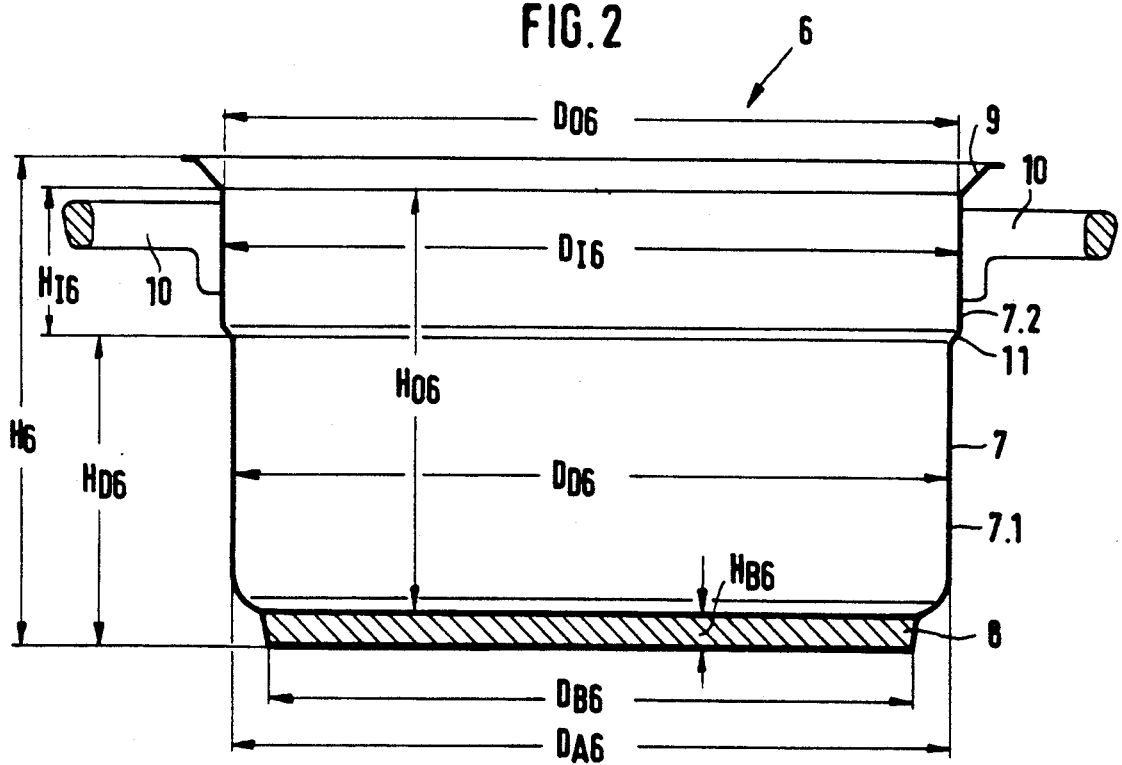
FIG. 2 is a diagrammatic view of a second cooking utensil of a set of cooking utensils.

FIG. 2 shows a second cooking utensil of the set. As a cooking pot 6, it is also provided with a circular cylindrical wall 7, a bottom 8, a bent, upper edge 9 and two opposite handles 10. Edge 9 and handles 10 correspond to edge 4 and handles 5 of cooking pot 1.

Bottom 8 of cooking pot 6 has a diameter $D_{B6}$ and a thickness $H_{B6}$ corresponding to diameter $D_{B1}$ and thickness $H_{B1}$ of bottom 3 of cooking pot 1. Opening width $D_{O6}$ of cooking pot 6 also corresponds to opening width $D_{O1}$ of cooking pot 1.

Wall 7 of cooking pot 6 comprises a first wall portion 7.1 adjoining the bottom, and a second wall portion 7.2 adjoining edge 9. Wall portions 7.1 and 7.2 are interconnected via a transition portion 11 which is expediently bent in the same way as edge 9. The second, upper wall portion 7.2 has an inner diameter $D_{I6}$ corresponding to opening width $D_{O6}$ and thus to inner width $D_{I1}$ and opening width $D_{O1}$ of cooking pot 1. The first, lower wall portion 7.1 has an outer diameter $D_{A6}$ which is smaller than the inner diameter $D_{I1}$ of cooking pot 1.

Height $H_6$ of cooking pot 6 is greater than height $H_1$ of cooking pot 1, height $H_{D6}$ of the first wall portion 7.1 of cooking pot 6 being matched to height $H_1$ of cooking pot 1 and bottom thickness $H_{B6}$ of bottom 8 of cooking pot 6 in such a way that, when cooking pot 6 is put into cooking pot 1 (see also FIG. 3), transition portion 11 of cooking pot 6 is at the same level as the upper edge 4 of cooking pot 1. The second wall portion 7.2 projects with its height $H_{D6}$ beyond cooking pot 1. Since handles 10 are arranged on the second wall portion 7.2, they do not interfere with the stacking operation.

Figure 3:
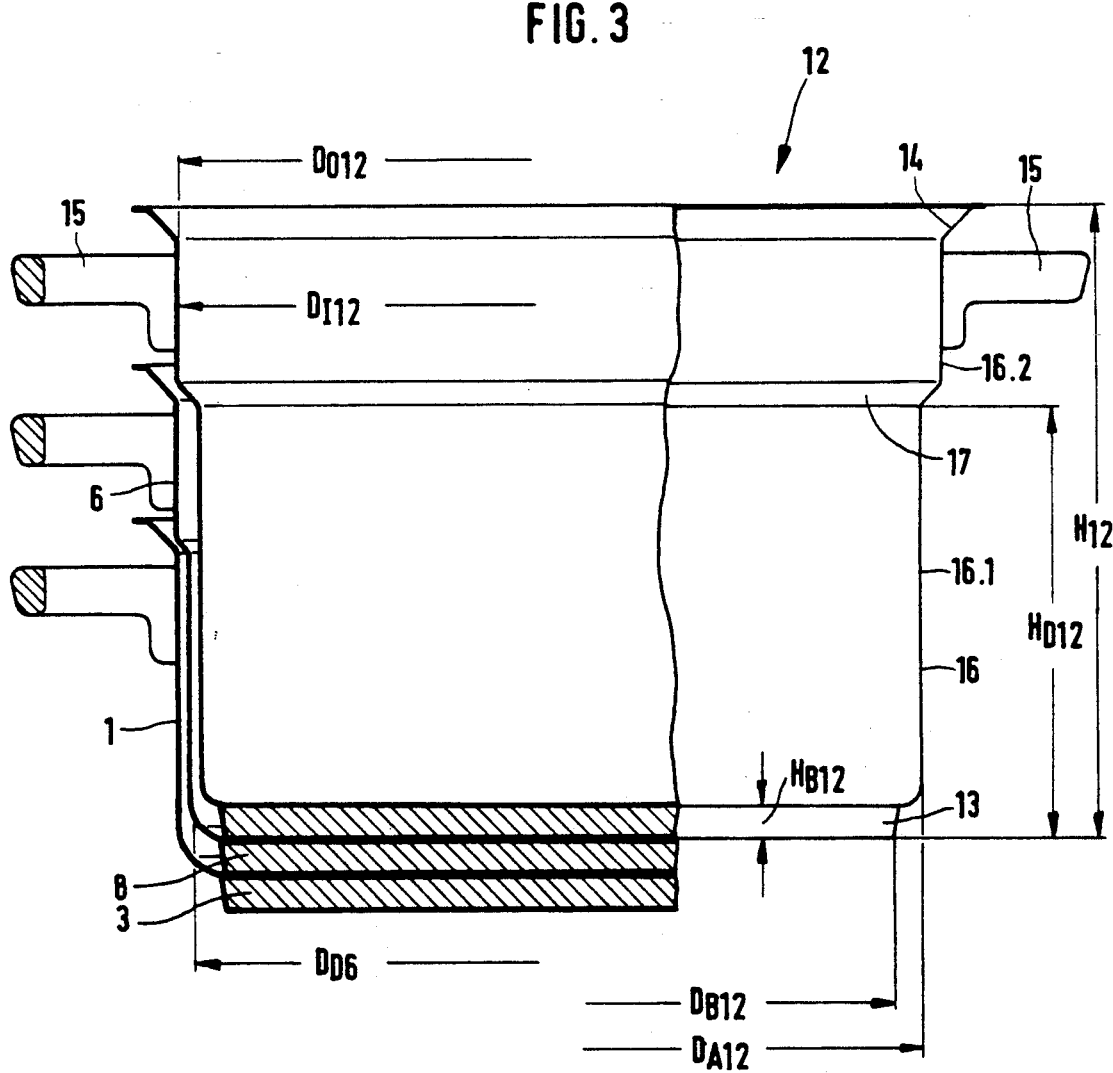
FIG. 3 is a diagrammatic partial section through a set of cooking utensils comprising three cooking utensils.

As illustrated in FIG. 3, cooking pots 1 and 6 can be put into each other in such a way that bottom 8 of cooking pot 6 is in full contact with bottom 3 of cooking pot 1.

The set of cooking utensils may optionally comprise a third cooking pot 12 and also other cooking utensils (not shown) that can be formed by analogy with cooking pot 12. Cooking pot 12, in turn, comprises a bottom 13 whose dimensions correspond to those of bottoms 3 and 8 of cooking pots 1 and 6. Likewise, an upper edge 14 of cooking pot 12 and handles 15 are identical with the corresponding elements of cooking pots 1 and 6. Furthermore, cooking pot 12 has the same opening width $D_{O12}$ as cooking utensils 1 and 6. It has a substantially cylindrical wall 16 which includes a first lower wall portion 16.1 of reduced dimension and a second wall portion 16.2 that are interconnected via a transition portion 17. The outer diameter $D_{A12}$ of the reduced first wall portion 16.1 is smaller than the inner diameter $D_{D6}$ of cooking pot 6. Height $H_{D12}$ of the first wall portion 16.1 is matched to height $H_{O6}$ of cooking pot 6 in such a way that transition portion 17 comes to rest near the upper edge 9 of cooking pot 6 when cooking pot 12 is inserted into cooking pot 6 such that bottom 13 rests on bottom 8.

The smallest possible stacking height is achieved with an insertion order as depicted in FIG. 3 for cooking utensils 1, 6 and 12. However, it is also possible to insert, e.g., cooking pot 6 into cooking pot 12. In this case, the first wall portion 7.1 of cooking pot 6 is inserted into cooking pot 12 to such an extent that the rounded connection portion between bottom 8 and wall 7 rests on transition portion 17 of cooking pot 12. In this case, too, safe stacking is ensured although, as far as this order is concerned, the bottom of the second cooking pot is not in contact with the bottom of the third cooking pot. To provide other stacking variants for cooking pots 1, 6 and 12, cooking pot 1 may also have a reduced wall portion (not shown). Furthermore, it is possible on account of the corresponding bending of transition portions 11, 17 and the upper edges 4, 9, 14 to stack other cooking utensils (not shown) in an order differing from the given order, i.e. big in small, by placing, e.g., a cooking utensil with a small height of the first wall portion in a cooking utensil with a greater height of the second wall portion, the transition portion of the inner cooking utensil being supported on the upper edge of the outer cooking utensil.

In a modification of the described and illustrated embodiment, pans, bowls, or the like, may be provided with reduced wall portions for stacking purposes instead of, or in addition to, the above-described cooking pots. This invention is also suited for cooking utensils having walls or cross sections of a non-cylindrical shape, e.g. inclined walls, or cross-sections of oval or rectangular shape.

What is claimed:

1. A set of cooking utensils comprising:
a first cooking utensil and at least a second cooking utensil, said first and second cooking utensils having different heights and identical opening widths, each cooking utensil having a bottom, a wall and an upper edge, said second cooking utensil being insertable into said first cooking utensil for storing purposes such that the bottom of said second cooking utensil rests on the bottom of said first cooking utensil, said second cooking utensil having a reduced width first wall portion which adjoins said bottom, a transition portion and a second wall portion, the outer width of said first wall portion of said second cooking utensil being smaller than the inner width of said first cooking utensil measured respectively from substantially equal distances from the bottom, the height of said first wall portion of said cooking utensil being substantially equal to the height of said first cooking utensil such that the bottom of said second cooking utensil is adapted to be put on the bottom of said first cooking utensil.

2. The set according to claim 1, wherein both wall portions extend in a direction substantially perpendicular to said bottom.

3. The set according to claim 2, characterized in that both wall portions have a circular cylindrical shape.

4. The set according to claim 3, wherein the bottom of said first and second cooking utensils have substantially the same thickness and the same width.

5. The set according to claim 4, further comprising a third cooking utensil having the same opening width as the first and second cooking utensils, the third cooking utensil also having a reduced first wall portion and a second wall portion.

6. The set according to claim 5, wherein said third cooking utensil is higher than said second cooking utensil and the outer width of the first wall portion of said third cooking utensil is smaller than the inner width of the first wall portion of said second cooking utensil.

7. The set according to claim 6, wherein the height of the first wall portion of said third cooking utensil is substantially equal to the height of the wall portion of said second cooking utensil such that the bottom of said third cooking utensil is adapted to be put on the bottom of the cooking utensil respectively positioned thereunder.

8. The cooking utensil according to claim 7, wherein said first cooking utensil has also a reduced width first wall portion with an outer width less than a second wall portion of said first cooking utensil.

9. The set according to claim 8, wherein the outer shape of said transition portion is matched to the inner shape of said upper edge.

10. The set according to claim 1, wherein said wall portion have a circular cylindrical shape.

11. The set according to claim 10, wherein the bottoms of said first and second cooking utensils have substantially the same thickness and the same width.

12. The set according to claim 1, wherein the bottoms of said first and second cooking utensils have substantially the same thickness and the same width.

13. The set according to claim 12, further comprising a third cooking utensil having the same opening width as said first and second cooking utensils, the third cooking utensil also having a reduced first wall portion and a second wall portion.

14. The set according to claim 1, further comprising a third cooking utensil having the same opening width as said first and second cooking utensils, the third cooking utensil also having a reduced first wall portion and a second wall portion.

15. The set according to claim 14, wherein said third cooking utensil is higher than said second cooking utensil and the outer width of the first wall portion of said third cooking utensil is smaller than the inner width of the first wall portion of said second cooking utensil.

16. The set according to claim 15, wherein the height of the first wall portion of aid third cooking utensil is substantially equal to the height of the wall portion of said second cooking utensil such that the bottom of said third cooking utensil is adapted to be put on the bottom of the cooking utensil respectively positioned thereunder.

17. The set according to claim 14, wherein the height of the first wall portion of said third cooking utensil is substantially equal to the height of the wall portion of said second cooking utensil such that the bottom of said third cooking utensil is adapted to be put on the bottom of the cooking utensil respectively positioned thereunder.

18. The set according to claim 1, wherein the outer shape of said transition portion is matched to the inner shape of said upper edge.

19. The set according to claim 1, wherein said first cooking utensil has also a reduced first wall portion with an outer width being decreased in comparison with a second wall portion.

* * * * *